US012157652B2

(12) United States Patent
Oda et al.

(10) Patent No.: US 12,157,652 B2
(45) Date of Patent: Dec. 3, 2024

(54) PRINTING DEVICE

(71) Applicant: Seiko Epson Corporation, Tokyo (JP)

(72) Inventors: Koji Oda, Shiojiri (JP); Koji Shimizu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 316 days.

(21) Appl. No.: 17/509,886

(22) Filed: Oct. 25, 2021

(65) Prior Publication Data

US 2022/0127099 A1 Apr. 28, 2022

(30) Foreign Application Priority Data

Oct. 27, 2020 (JP) ................................ 2020-179518

(51) Int. Cl.

| | |
|---|---|
| ***B65H 31/22*** | (2006.01) |
| ***B41J 13/10*** | (2006.01) |
| ***B65H 31/24*** | (2006.01) |
| ***B65H 43/02*** | (2006.01) |
| ***B65H 43/06*** | (2006.01) |

(52) U.S. Cl.

CPC ............ *B65H 31/24* (2013.01); *B41J 13/106* (2013.01); *B65H 43/06* (2013.01)

(58) Field of Classification Search

CPC ........ B65H 31/22; B65H 31/24; B65H 31/02; B65H 2405/332; B65H 43/02; B65H 43/06; B65H 43/08; B65H 2405/1116; B65H 2405/11161; B41J 13/106

See application file for complete search history.

(56) References Cited

U.S. PATENT DOCUMENTS

| | | | | |
|---|---|---|---|---|
| 2002/0118351 A1* | 8/2002 | Takoh | .................... | B65H 39/11 355/72 |
| 2019/0161311 A1* | 5/2019 | Takahashi | .............. | B65H 33/14 |
| 2019/0225453 A1* | 7/2019 | Sato | ...................... | B65H 31/24 |

FOREIGN PATENT DOCUMENTS

| | | | |
|---|---|---|---|
| JP | 09208110 A | * | 8/1997 |
| JP | 2000044105 A | * | 2/2000 |
| JP | 2001-106419 A | | 4/2001 |
| JP | 2002249273 A | * | 9/2002 |
| JP | 2010-085431 | | 4/2010 |

* cited by examiner

*Primary Examiner* — Luis A Gonzalez
(74) *Attorney, Agent, or Firm* — WORKMAN NYDEGGER

(57) ABSTRACT

A printing device includes a recording portion performing recording on a medium; a discharge tray loading the medium recorded; a first detector configured to detect the medium of a first load capacity loaded on the discharge tray; a second detector configured to detect the medium of a second load capacity smaller than the first load capacity loaded on the discharge tray; a mounting portion on which an optional device is mounted; and a controller controlling the recording by the recording portion, in which the optional device mounted on the mounting portion is positioned above the discharge tray, the first detector and the second detector are positioned below the optional device mounted on the mounting portion, and when the first detector detects the medium of the first load capacity in a non-mounted case in which the optional device is not mounted, the controller executes full load processing.

6 Claims, 3 Drawing Sheets

PRINTING DEVICE

The present application is based on, and claims priority from JP Application Serial Number 2020-179518, filed Oct. 27, 2020, the disclosure of which is hereby incorporated by reference herein in its entirety.

BACKGROUND

1. Technical Field

The present disclosure relates to a printing device.

2. Related Art

For example, as in JP-A-2010-85431, there is an image forming apparatus which is an example of a printing device which prints on paper which is an example of a medium. The image forming apparatus includes a loading tray, which is an example of a discharge tray for loading the printed paper. An additional paper discharge unit, which is an example of an optional device, can be mounted on the image forming apparatus. The additional paper discharge unit is provided at a position above the loading tray and away from the loading tray.

The maximum load capacity, which is the amount of medium that can be loaded on the discharge tray, varies depending on whether or not the optional device is mounted. In a printing device on which the optional device can be mounted, it is desired to appropriately manage the load capacity of the medium loaded on the discharge tray when the optional device is not mounted.

SUMMARY

A printing device for solving the above problems includes a recording portion performing recording on a medium; a discharge tray loading the medium recorded by the recording portion; a first detector configured to detect the medium having a first load capacity loaded on the discharge tray; a second detector configured to detect the medium having a second load capacity smaller than the first load capacity loaded on the discharge tray; a mounting portion on which an optional device is mounted; and a controller controlling the recording by the recording portion, in which the optional device mounted on the mounting portion is positioned above the discharge tray, the first detector and the second detector are positioned below the optional device mounted on the mounting portion, and when the first detector detects the medium having the first load capacity in a non-mounted case in which the optional device is not mounted, the controller executes full load processing.

DESCRIPTION OF EXEMPLARY EMBODIMENTS

Figure 1:
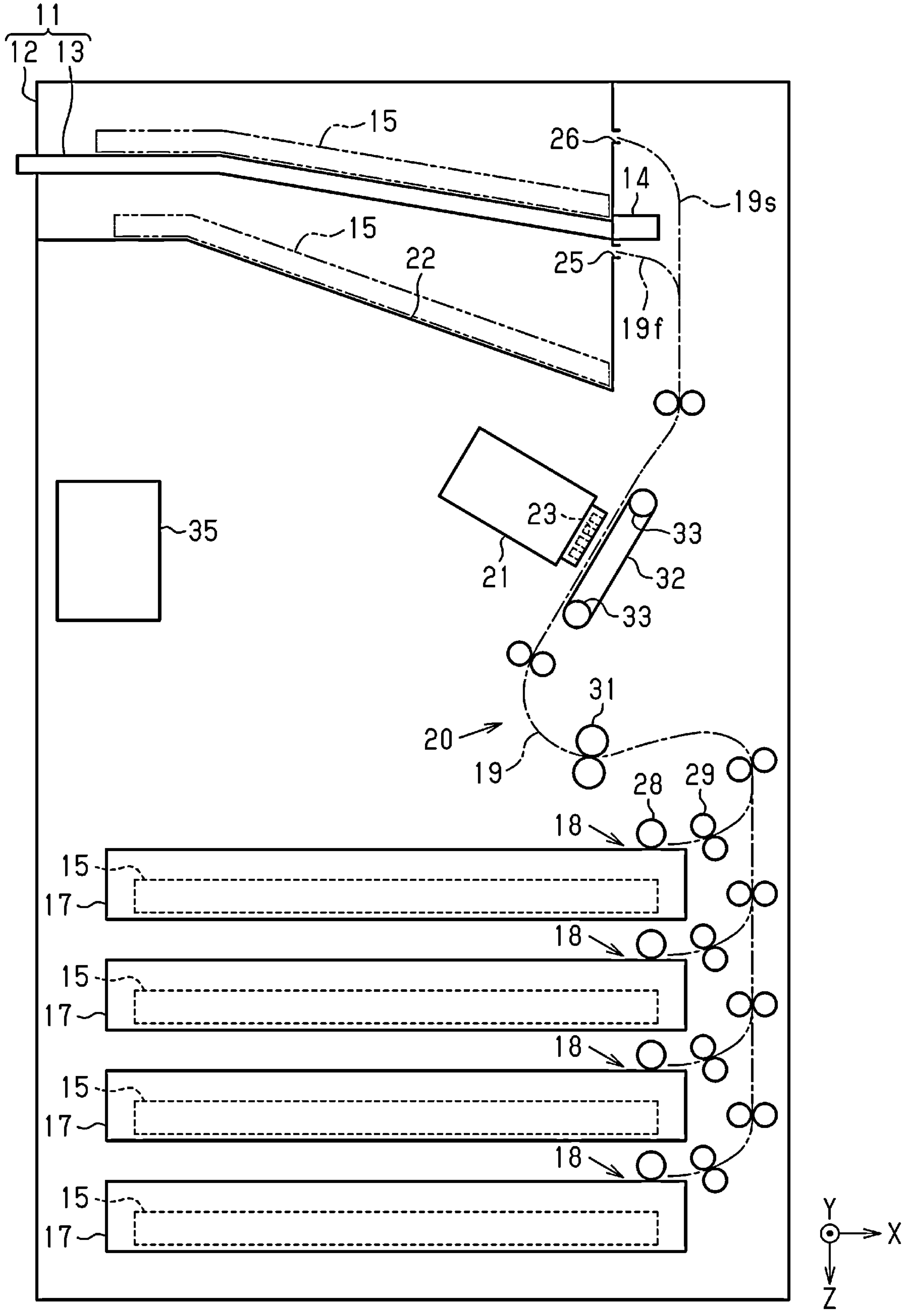
FIG. 1 is a schematic view of an embodiment of a printing device on which an optional device is mounted.

Hereinafter, an embodiment of a printing device and a printing system will be described with reference to the drawings. The printing device of the present embodiment is, for example, an ink jet printer that discharges ink, which is an example of a liquid, to print on a medium such as paper.

In the drawings, assuming that a printing system 11 is placed on a horizontal plane, a direction of gravity is indicated by a Z axis, and a direction along the horizontal plane is indicated by an X axis and a Y axis. The X axis, the Y axis, and the Z axis are orthogonal to each other. In the following description, the direction parallel to the Y axis is also referred to as a depth direction Y, and a direction parallel to the Z axis is also referred to as a vertical direction Z.

As illustrated in FIG. 1, the printing system 11 includes a printing device 12 and an optional device 13 mounted on the printing device 12. The printing device 12 includes a mounting portion 14 on which the optional device 13 can be mounted. The optional device 13 is detachably mounted on the mounting portion 14. The optional device 13 of the present embodiment is a tray on which a recorded medium 15 can be loaded.

The printing device 12 may include a medium accommodating portion 17 capable of accommodating the medium 15, a feeding portion 18 for feeding the medium 15, and a transport portion 20 for transporting the medium 15 along a transport path 19 illustrated by an alternated long and short dash line in the drawing. The printing device 12 includes a recording portion 21 for performing the recording on the medium 15, and a discharge tray 22 for loading the medium 15 recorded by the recording portion 21. The recording portion 21 of the present embodiment discharges a liquid from a nozzle 23 and performs the recording.

The transport path 19 may include a first branch path **19*f* and a second branch path 19*s*. The first branch path 19*f* is coupled to a first discharge port 25 that discharges the medium 15 to the discharge tray 22. The second branch path 19*s* is coupled to a second discharge port 26 positioned above the first discharge port 25. When the optional device 13 is mounted, the medium 15 discharged from the second discharge port 26 is loaded on the optional device 13**.

The medium accommodating portion 17 can accommodate a plurality of media 15 in a stacked state. The printing device 12 may include a plurality of medium accommodating portions 17 and the same number of feeding portions 18 as the medium accommodating portions 17. The feeding portion 18 may include a feeding roller 28 that feeds the medium 15 accommodated in the medium accommodating portion 17, and a separating portion 29 that separates the media 15 one by one. The feeding portion 18 sends the medium 15 accommodated in the medium accommodating portion 17 to the transport path 19.

The transport portion 20 may include a transport roller 31, an endless transport belt 32, and a plurality of pulleys 33 on which the transport belt 32 is hung. The transport portion 20 may include a plurality of transport rollers 31. The transport roller 31 transports the medium 15 by rotating while pinching the medium 15. The transport belt 32 transports the medium 15 by orbiting the medium 15 that is supported by electrostatic adsorption, for example.

The printing device 12 includes a controller 35 that controls the recording by the recording portion 21. The controller 35 may control various operations executed by the printing device 12. The controller 35 can be configured as a circuit including α: one or more processors that perform various kinds of processing according to a computer program, β: one or more dedicated hardware circuits such as integrated circuits for specific applications that execute at least a part of various kinds of processing, or γ: a combination thereof. The processor includes a CPU and a memory such as a RAM and a ROM, and the memory stores a program code or an instruction configured to cause the CPU to execute the processing. The memory, that is, a computer-readable medium includes any readable medium that can be accessed by a general-purpose or dedicated computer.

Figure 2:
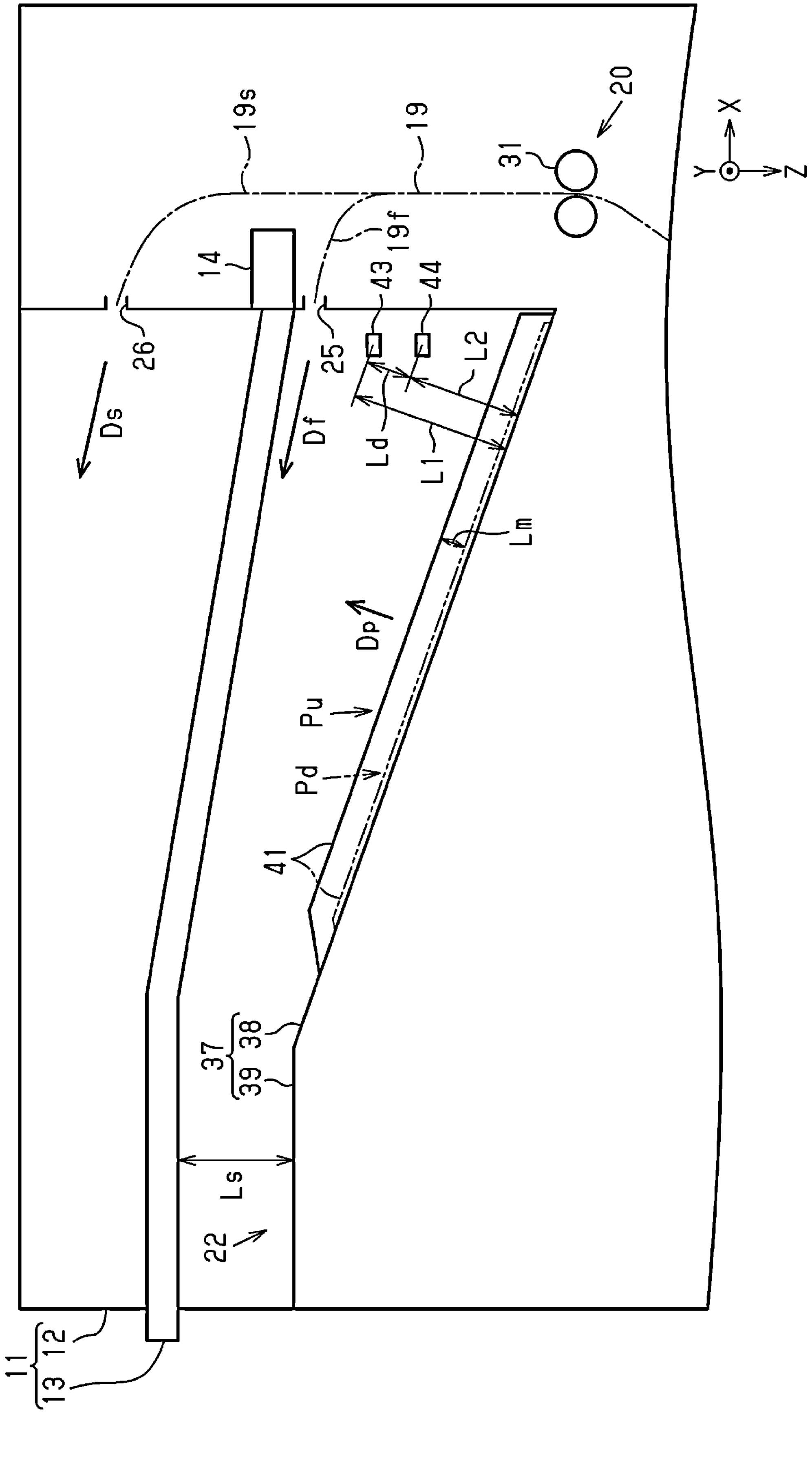
FIG. 2 is a schematic view of a discharge tray.

As illustrated in FIG. 2, the mounting portion 14 may be positioned between the first discharge port 25 and the second discharge port 26 in a vertical direction Z. The optional device 13 mounted on the mounting portion 14 is positioned above the discharge tray 22. The optional device 13 is mounted above the first discharge port 25 and away from the discharge tray 22. Therefore, the medium 15 discharged from the first discharge port 25 is loaded on the discharge tray 22 even when the optional device 13 is mounted. The medium 15 discharged from the second discharge port 26 is loaded on the optional device 13 when the optional device 13 is mounted.

The transport portion 20 discharges the medium 15 from the first discharge port 25 in a first discharge direction Df. The transport portion 20 discharges the medium 15 from the second discharge port 26 in a second discharge direction Ds. The first discharge direction Df and the second discharge direction Ds may be the same direction or may be different directions.

The discharge tray 22 has a loading surface 37 on which the medium 15 is loaded. The medium 15 is stacked in a loading direction Dp perpendicular to the loading surface 37. The loading direction Dp includes a component in the vertical direction Z. The loading surface 37 may have an inclined surface 38 that is inclined with respect to a horizontal plane and a planar surface 39 that is gentler in inclination than the inclined surface 38. The planar surface 39 is positioned downstream of the inclined surface 38 in the first discharge direction Df, and is coupled to a downstream end of the inclined surface 38. In the first discharge direction Df, the downstream end of the inclined surface 38 is positioned above an upstream end of the inclined surface 38.

A distance between the optional device 13 mounted on the mounting portion 14 and the discharge tray 22 in the loading direction Dp is shorter in the downstream than in the upstream of the first discharge direction Df. In the present embodiment, a distance between the optional device 13 and the planar surface 39 in the loading direction Dp is the shortest distance Ls between the optional device 13 mounted on the mounting portion 14 and the discharge tray 22.

The discharge tray 22 may have a moving portion 41 that can move in the loading direction Dp. Specifically, the moving portion 41 can move to a lower position Pd illustrated by an alternate long and two short dashes line in FIG. 2 and an upper position Pu illustrated by a solid line in FIG. 2 above the lower position Pd. The moving portion 41 of the present embodiment is provided at the center of the depth direction Y. The moving portion 41 positioned at the lower position Pd moves in the loading direction Dp by a moving distance Lm and reaches the upper position Pu. The moving distance Lm is a distance from the lower position Pd to the upper position Pu.

The printing device 12 includes a first detector 43 and a second detector 44 that can detect the medium 15 loaded on the discharge tray 22. The first detector 43 and the second detector 44 are positioned below the optional device 13 mounted on the mounting portion 14. The second detector 44 is positioned below the first detector 43. In other words, in the vertical direction Z and the loading direction Dp, the first detector 43 and the second detector 44 are positioned between the optional device 13 and the discharge tray 22. In the vertical direction Z and the loading direction Dp, the first detector 43 is positioned between the optional device 13 and the second detector 44. In the vertical direction Z and the loading direction Dp, the second detector 44 is positioned between the first detector 43 and the discharge tray 22.

The first detector 43 and the second detector 44 may be positioned upstream from the center of the discharge tray 22 in the first discharge direction Df. The first detector 43 and the second detector 44 may be positioned between the center of the discharge tray 22 and the first discharge port 25 in the first discharge direction Df.

A first distance L1 from the discharge tray 22 to the first detector 43 is greater than a second distance L2 from the discharge tray 22 to the second detector 44. The first distance L1 of the present embodiment is a distance in the loading direction Dp from the loading surface 37 to a position where the first detector 43 detects the medium 15. The second distance L2 of the present embodiment is a distance in the loading direction Dp from the loading surface 37 to a position where the second detector 44 detects the medium 15.

The first distance L1 may be longer than the shortest distance Ls. The second distance L2 may be the shortest distance Ls or less. That is, the shortest distance Ls in the loading direction Dp between the optional device 13 mounted on the mounting portion 14 and the loading surface 37 may be longer than the second distance L2 in the loading direction Dp between the second detector 44 and the loading surface 37.

The first distance L1 and the second distance L2 may be longer than the moving distance Lm. A difference distance Ld from the first detector 43 to the second detector 44 is equal to a difference between the first distance L1 and the second distance L2. The difference distance Ld may be equal to or greater than the moving distance Lm in which the moving portion 41 moves. In other words, the moving distance Lm from the lower position Pd to the upper position Pu may be shorter than the difference distance Ld from the first detector 43 to the second detector 44.

The first detector 43 and the second detector 44 of the present embodiment have the same configuration. Therefore, the first detector 43 will be described, and the description of the second detector 44 will be omitted. The first detector 43 is an optical sensor having, for example, an irradiation portion that emits light and a light receiving portion that receives light emitted from the irradiation portion. The irradiation portion and the light receiving portion may be provided to have a gap larger than that of the medium 15 in the depth direction Y at the same positions in the vertical direction Z, the loading direction Dp, and the first discharge direction Df.

The first detector 43 can detect the medium 15 having a first load capacity loaded on the discharge tray 22. The first detector 43 detects the medium 15 having the first load capacity by the loaded medium 15 blocking the light emitted from the irradiation portion. The first load capacity is the amount of the medium 15 when the moving portion 41 is positioned at the lower position Pd and the highest medium 15 among the media 15 loaded on the discharge tray 22 is at the same position as the first detector 43 in the loading direction Dp. A thickness of the media 15 having the first load capacity is equal to the first distance L1.

The second detector 44 can detect the medium 15 having a second load capacity loaded on the discharge tray 22. The second load capacity is smaller than the first load capacity. The second detector 44 detects the medium 15 having the second load capacity by the loaded medium 15 blocking the light emitted from the irradiation portion. The second load capacity is the amount of the medium 15 when the moving portion 41 is positioned at the lower position Pd and the highest medium 15 among the media 15 loaded on the discharge tray 22 is at the same height as the second detector 44 in the loading direction Dp. A thickness of the media 15 having the second load capacity is equal to the second distance L2.

Next, a recording processing routine executed by the controller 35 will be described with reference to a flowchart illustrated in FIG. 3. This recording processing routine is executed at the timing when a recording instruction is received. As an initial state, the moving portion 41 is positioned at the lower position Pd.

Figure 3:
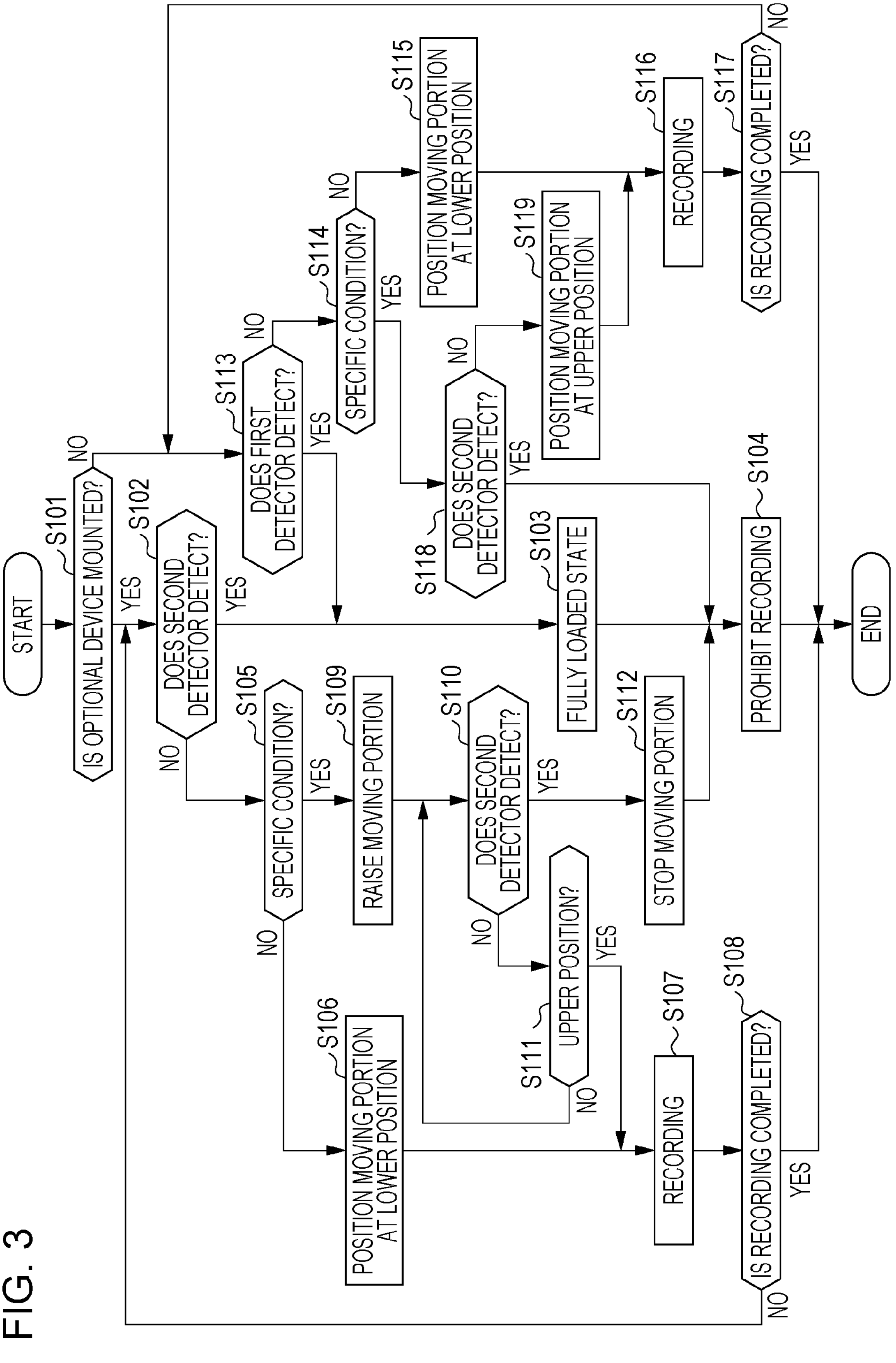
FIG. 3 is a flowchart illustrating a recording processing routine.

As illustrated in FIG. 3, in step S101, the controller 35 determines whether or not the optional device 13 is mounted. The controller 35 may determine whether or not the optional device is mounted based on information input by a user, or may determine whether or not the optional device 13 is mounted based on a detection result of a sensor (not illustrated) that detects the mounted optional device 13.

If the optional device 13 is mounted, step S101 becomes YES, and the controller 35 shifts the processing to step S102. In step S102, the controller 35 determines whether or not the second detector 44 has detected the medium 15. If the second detector 44 detects the medium 15, step S102 becomes YES, and the controller 35 shifts the processing to step S103. In step S103, the controller 35 determines that the discharge tray 22 is in a fully loaded state. In step S104, the controller 35 prohibits a recording by the recording portion 21 as an example of the full load processing, and ends the recording processing routine.

In step S102, if the second detector 44 has not detected the medium 15, step S102 becomes NO, and the controller 35 shifts the processing to step S105. In step S105, the controller 35 determines whether or not an ordered recording is a recording under specific conditions. If the recording is not performed under the specific conditions, step S105 becomes NO, and the controller 35 shifts the processing to step S106.

In step S106, the controller 35 positions the moving portion 41 at the lower position Pd. When the moving portion 41 is previously positioned at the lower position Pd, the controller 35 keeps the moving portion 41 at the lower position Pd. In step S107, the controller 35 performs a recording on the medium 15 and loads the recorded medium 15 on the discharge tray 22.

In step S108, the controller 35 determines whether or not the recording is completed. If the recording remains, step S108 becomes NO, and the controller 35 shifts the processing to step S102. If the recording is completed, step S108 becomes YES, and the controller 35 ends the recording processing routine.

In step S105, if the recording is the recording under the specific conditions, step S105 becomes YES, and the controller 35 shifts the processing to step S109. In step S109, the controller 35 raises the moving portion 41.

In step S110, the controller 35 determines whether or not the second detector 44 has detected the medium 15. In step S110, if the second detector 44 has not detected the medium 15, step S110 becomes NO, and the controller 35 shifts the processing to step S111. In step S111, the controller 35 determines whether or not the moving portion 41 has moved to the upper position Pu. If the moving portion 41 moves to the upper position Pu and stops, step S111 becomes YES, and the controller 35 shifts the processing to step S107. If the moving portion 41 is in the process of being raised, step S111 becomes NO, and the controller 35 shifts the processing to step S110.

In step S110, if the second detector 44 has detected the medium 15, step S110 becomes YES, and the controller 35 shifts the processing to step S112. In step S112, the controller 35 stops the movement of the moving portion 41 as an example of the full load processing, and shifts the processing to step S104. In step S104, the controller 35 prohibits a recording by the recording portion 21 as an example of the full load processing, and ends the recording processing routine.

In step S101, if the optional device 13 is not mounted, step S101 becomes NO, and the controller 35 shifts the processing to step S113. In step S113, the controller 35 determines whether or not the first detector 43 has detected the medium 15. If the first detector 43 detects the medium 15, step S113 becomes YES, and the controller 35 shifts the processing to step S103.

In step S113, if the first detector 43 has not detected the medium 15, step S113 becomes NO, and the controller 35 shifts the processing to step S114. In step S114, the controller 35 determines whether or not an ordered recording is a recording under specific conditions. If the ordered recording is not the recording under the specific conditions, step S114 becomes NO, and the controller 35 shifts the processing to step S115.

In step S115, the controller 35 positions the moving portion 41 at the lower position Pd. When the moving portion 41 is previously positioned at the lower position Pd, the controller 35 keeps the moving portion 41 at the lower position Pd. In step S116, the controller 35 performs a recording on the medium 15 and loads the recorded medium 15 on the discharge tray 22.

In step S117, the controller 35 determines whether or not the recording is completed. If the recording remains, step S117 becomes NO, and the controller 35 shifts the processing to step S113. If the recording is completed, step S117 becomes YES, and the controller 35 ends the recording processing routine.

In step S114, if the recording is the recording under the specific conditions, step S114 becomes YES, and the controller 35 shifts the processing to step S118. In step S118, the controller 35 determines whether or not the second detector 44 has detected the medium 15. If the second detector 44 detects the medium 15, step S118 becomes NO, and the controller 35 shifts the processing to step S119. In step S119, the controller 35 positions the moving portion 41 at the upper position Pu, and shifts the processing to step S116. When the moving portion 41 is previously positioned at the upper position Pu, the controller 35 keeps the moving portion 41 at the upper position Pu.

In step S118, if the second detector 44 has detected the medium 15, step S118 becomes YES, and the controller 35 shifts the processing to step S104. In step S104, the controller 35 prohibits a recording by the recording portion 21 as an example of the full load processing, and ends the recording processing routine.

The operations of the present embodiment will be described.

If the first detector 43 detects the medium 15 having the first load capacity in a non-mounted case in which the optional device 13 is not mounted, the controller 35 determines that the discharge tray 22 is in a fully loaded state in which the medium 15 is fully loaded on the discharge tray 22. When it is determined that the discharge tray 22 is in the fully loaded state, the controller 35 executes the full load processing. The controller 35 of the present embodiment prohibits the recording by the recording portion 21 as an example of the full load processing.

The controller 35 may position the moving portion 41 at the upper position Pu when performing the recording under specific conditions. The specific condition is, for example, a condition in which a so-called curl that deforms the medium 15 so as to be curved is likely to occur. The medium 15 is more likely to curl as a width becomes larger, a basis weight becomes smaller, a printing rate on the medium 15 becomes higher, and an amount of liquid attached to the medium 15 becomes larger. The conditions under which the curl is likely to occur are not limited thereto, and other parameters such as the temperature and humidity of an environment in which the printing device 12 is placed, the time for drying the medium 15, and other parameters may be used. The controller 35 may store in advance a specific condition that is a combination of one or a plurality of conditions that affect the ease of curling.

In the non-mounted case in which the optional device 13 is not mounted, if the second detector 44 detects the medium 15 in the state in which the moving portion 41 is at the lower position Pd, the controller 35 may prohibit the recording under the specific conditions as an example of the full load processing. Since the recording under the specific conditions is performed by positioning the moving portion 41 at the upper position Pu, there is a possibility that the first detector 43 detects the medium 15 as the moving portion 41 rises. If the second detector 44 detects the medium 15 in the state in which the optional device 13 is not mounted and the moving portion 41 is at the lower position Pd, the controller 35 may allow the recording performed by positioning the moving portion 41 at the lower position Pd, and prohibit the recording performed by positioning the moving portion 41 at the upper position Pu as an example of the full load processing.

In a mounted case in which the optional device 13 is mounted, if the second detector 44 detects the medium 15 having the second load capacity, the controller 35 determines that the discharge tray 22 is in the fully loaded state. If it is determined that the discharge tray 22 is in the fully loaded state, the controller 35 may prohibit the recording by the recording portion 21 as an example of the full load processing, and may change a discharge destination of the medium 15 to the optional device 13 as an example of the full load processing and perform the recording.

In the mounted case in which the optional device 13 is mounted, if the second detector 44 detects the medium 15 when the moving portion 41 is moved from the lower position Pd to the upper position Pu, the controller 35 may prohibit the recording under the specific conditions as an example of the full load processing. That is, the controller 35 may stop the raising of the moving portion 41.

The effects of the present embodiment will be described.

(1) The optional device 13 mounted on the mounting portion 14 is positioned above the discharge tray 22. Therefore, the maximum load capacity that can be loaded on the discharge tray 22 in the non-mounted case in which the optional device 13 is not mounted is larger than the maximum load capacity that can be loaded on the discharge tray 22 in the mounted case in which the optional device 13 is mounted. The first load capacity detected by the first detector 43 is larger than the second load capacity detected by the second detector 44. If the first detector 43 detects the medium 15 in the non-mounted case of the optional device 13, the controller 35 executes the full load processing. Therefore, the load capacity of the medium 15 loaded on the discharge tray 22 can be managed.

(2) The controller 35 executes the full load processing using detection results of the first detector 43 and the second detector 44. That is, the controller 35 uses the detection result of the first detector 43 when the optional device 13 is not mounted, and uses the detection result of the second detector 44 when the optional device 13 is mounted. Therefore, the load capacity of the medium 15 can be managed depending on whether or not the optional device 13 is mounted.

(3) The controller 35 may position the moving portion 41 at the upper position Pu when performing the recording under specific conditions. Therefore, the medium 15 recorded under the specific conditions can be satisfactorily loaded on the discharge tray 22.

(4) If the moving portion 41 moves from the lower position Pd to the upper position Pu, the medium 15 loaded on the moving portion 41 also rises. If the first detector 43 detects the raised medium 15, the controller 35 executes the full load processing. If the second detector 44 detects the medium 15 in the non-mounted case of the optional device 13, the controller 35 executes the full load processing. Therefore, the full load processing can be executed before the moving portion 41 is moved to the upper position Pu.

(5) When the moving portion 41 is moved to the upper position Pu, the loaded medium 15 is pushed up, and the gap between the medium 15 and the optional device 13 becomes smaller. When the medium 15 is passed through a small gap, there may be a possibility that the medium 15 is caught. In that respect, if the second detector 44 detects the medium 15 when the moving portion 41 is moved to the upper position Pu, the controller 35 executes the full load processing. Therefore, the possibility of the medium 15 getting caught can be reduced.

(6) If the moving portion 41 is moved from the lower position Pd to the upper position Pu with the medium 15 loaded, the loaded medium 15 is pushed up. For example, when the moving distance Lm from the lower position Pd to the upper position Pu is longer than the difference distance Ld from the first detector 43 to the second detector 44, the first detector 43 may detect the medium 15 when the moving portion 41 is moved to the upper position Pu, even if the second detector 44 does not detect the medium 15 when the moving portion 41 is positioned at the lower position Pd. In that respect, the moving distance Lm from the lower position Pd to the upper position Pu is shorter than the difference distance Ld from the first detector 43 to the second detector 44. Therefore, it is possible to reduce the possibility that the first detector 43 detects the medium 15 after moving the moving portion 41 to the upper position Pu.

(7) The shortest distance Ls between the optional device 13 mounted on the mounting portion 14 and the loading surface 37 is longer than the second distance L2 between the second detector 44 and the loading surface 37. The shortest distance Ls between the optional device 13 and the loading surface 37 is the maximum load capacity that can be loaded on the discharge tray 22 when the optional device 13 is mounted. The second distance L2 between the second detector 44 and the loading surface 37 is the second loading capacity detected by the second detector 44. That is, since the maximum load capacity is larger than the second load capacity, a possibility of overloading can be reduced. In addition, even when the medium 15 is curled on the downstream of the first discharge direction Df, since the maximum load capacity is larger than the second load capacity, the subsequent medium 15 can be discharged while allowing the curl on the downstream of the first discharge direction Df. Therefore, it is possible to reduce the possibility of overloading or the discharge failure caused by the subsequent medium 15 colliding with the medium 15 already mounted on the loading surface 37.

(8) The recorded medium 15 may be deformed so as to be curved. Such deformation is also called curl. The controller 35 performs recording under specific conditions by positioning the moving portion 41 at the upper position Pu. The moving portion 41 corrects the curled medium 15 by being positioned at the upper position Pu and supporting a part of the medium 15. Therefore, even when the specific condition is a condition in which the medium 15 is likely to be curled, the curl of the medium 15 recorded under the specific condition can be reduced.

(9) The curl of the medium 15 tends to become larger as it is positioned in a wider space. The distance between the discharge tray 22 and the optional device 13 is larger in the upstream than in the downstream of the first discharge direction Df. That is, the curl of the medium 15 loaded on the discharge tray 22 tends to be larger in the upstream than in the downstream of the first discharge direction Df. The first detector 43 and the second detector 44 may be positioned upstream from the center of the discharge tray 22 in the first discharge direction Df. Therefore, the first detector 43 and the second detector 44 can detect the curl of the medium 15.

(10) The full load processing prohibits recording. When the controller 35 prohibits the recording, the loading of the medium 15 on the discharge tray 22 is also stopped. Therefore, the possibility of overloading can be reduced.

The present embodiment can be implemented by changing as follows. The present embodiment and the following modified examples can be implemented in combination with each other within a technically consistent range.

- The printing device 12 may include a notification portion that notifies the user of information. The notification portion may be a monitor that notifies by characters or images, a speaker that notifies by sound or voice, or a light that notifies by lighting or flickering light. As an example of the full load processing, the controller 35 may notify the notification portion that the discharge tray 22 is in the fully loaded state. If the second detector 44 detects the medium 15 when the optional device 13 is not mounted, the controller 35 may notify the notification portion that the discharge tray 22 is almost fully loaded.
- The discharge tray 22 may be configured so as not to include the moving portion 41. The discharge tray 22 may include a moving portion that can move the entire loading surface 37 or the entire inclined surface 38. By raising the loading surface 37 or the inclined surface 38, the loading surface 37 or the inclined surface 38 can be brought close to the first discharge port 25. For example, the specific condition may be a condition in which the loaded media 15 are easily displaced from each other, such as when the basis weight of the medium 15 is small. By discharging the medium 15 from the first discharge port 25 with the loading surface 37 or the inclined surface 38 being brought close to the first discharge port 25, it is possible to suppress the displacement of the media 15 loaded on the discharge tray 22.
- If the first detector 43 detects the medium 15 in the state in which the moving portion 41 is positioned at the upper position Pu, the controller 35 may move the moving portion 41 to the lower position Pd and perform the recording.
- The shortest distance Ls between the optional device 13 mounted on the mounting portion 14 and the discharge tray 22 may be equal to or less than the second distance L2 between the second detector 44 and the discharge tray 22.
- The moving distance Lm from the lower position Pd to the upper position Pu may be greater than or equal to the difference distance Ld from the first detector 43 to the second detector 44.
- The controller 35 does not have to move the moving portion 41 when the optional device 13 is mounted. That is, when the optional device 13 is mounted, the controller 35 may perform the recording in the state in which the moving portion 41 is positioned at the lower position Pd.
- Even if the second detector 44 detects the medium 15 when the optional device 13 is not mounted, the controller 35 may perform the recording under a specific condition for positioning the moving portion 41 at the upper position Pu.
- The printing device 12 may include a tray that receives the recorded medium 15 separately from the discharge tray 22. As an example of the full load processing, the controller 35 may discharge the medium 15 to a tray different from the discharge tray 22.
- The optional device 13 may be a post-processing device that performs post-processing on the recorded medium 15, or may be a relay mechanism that couples the post-processing device and the printing device 12. The optional device 13 may be a reversing mechanism that performs the recording on both sides of the medium 15.
- The first detector 43 and the second detector 44 may be lever sensors that detect the position of the highest medium 15 by contacting the loaded media 15. The first detector 43 and the second detector 44 may be distance sensors that detect the distance to the highest medium 15 among the loaded media 15. The first detector 43 and the second detector 44 may be image sensors that detect the thickness of the stacked media 15. The first detector 43 and the second detector 44 may be weight sensors that measure the weight of the loaded media 15. The first detector 43 and the second detector 44 may be configured by different types of sensors.
- The first distance L1 may be the distance in the loading direction Dp from the moving portion 41 to the position where the first detector 43 detects the medium 15. The second distance L2 may be the distance in the loading direction Dp from the moving portion 41 to the position where the second detector 44 detects the medium 15.
- The printing device 12 may be a printing device that ejects or discharges a liquid other than ink. The state of the liquid discharged as a minute amount of droplets from the printing device also includes those having a granular, tear-like, or thread-like tail. The liquid referred to here may be any material that can be discharged from the printing device. For example, the liquid may be in a state when the substance is liquefied, and includes fluid-phase bodies such as highly viscous or slightly viscous liquefied body, sol, gel water, other inorganic solvents, organic solvents, solutions, liquefied resins, liquefied metals, metal melts, and the like. The liquid includes not only a liquid as one state of a substance but also a liquid in which particles of a functional material made of a solid substance such as a pigment or a metal particle are dissolved, dispersed or mixed in a solvent. Typical examples of the liquid include the ink, the liquid crystal, and the like as described in the above-described embodiment. Here, the ink includes general water-based inks, oil-based inks, and various liquid compositions such as gel inks and hot melt inks. Specific examples of the printing device include a device that discharges a liquid containing materials such as electrode materials and color materials used in the manufacture of liquid crystal displays, electroluminescence displays, surface emitting displays, and color filters in the form of dispersion or dissolution. The printing device may be a device that discharges a bioorganic substance used for producing a biochip, a device that discharges a liquid as a sample used as a precision pipette, a printer, a micro dispenser, or the like. The printing device may be a device that discharges lubricating oil with pinpoint accuracy to precision machinery such as watches and cameras, and a device that discharges a transparent resin liquid such as an ultraviolet curable resin onto a substrate to form a hemispherical microlens, an optical lens, etc. used for an optical communication element or the like. The printing device may be a device that discharges an etching solution such as an acid or an alkali in order to etch a substrate or the like.

The technical idea grasped from the above-described embodiments and modified examples and the actions and effects thereof are described below.

(A) A printing device includes a recording portion performing recording on a medium; a discharge tray loading the medium recorded by the recording portion; a first detector configured to detect the medium having a first load capacity loaded on the discharge tray; a second detector configured to detect the medium having a second load capacity smaller than the first load capacity loaded on the discharge tray; a mounting portion on which an optional device is mounted; and a controller controlling the recording by the recording portion, in which the optional device mounted on the mounting portion is positioned above the discharge tray, the first detector and the second detector are positioned below the optional device mounted on the mounting portion, and when the first detector detects the medium having the first load capacity in a non-mounted case in which the optional device is not mounted, the controller executes full load processing.

According to such a configuration, the optional device mounted on the mounting portion is positioned above the discharge tray. Therefore, the maximum load capacity that can be loaded on the discharge tray in the non-mounted case in which the optional device is not mounted is larger than the maximum load capacity that can be loaded on the discharge tray in a mounted case in which the optional device is mounted. The first load capacity detected by the first detector is larger than the second load capacity detected by the second detector. When the first detector detects the medium in the non-mounted case of the optional device, the controller executes the full load processing. Therefore, even when the maximum load capacity that can be loaded on the discharge tray changes, the load capacity of the medium loaded on the discharge tray can be appropriately managed, and loadability of the medium can be ensured.

(B) In the printing device, when the second detector detects the medium having the second load capacity in a mounted case in which the optional device is mounted, the controller may execute the full load processing.

According to such a configuration, the controller executes the full load processing using detection results of the first detector and the second detector. That is, the controller uses the detection result of the first detector when the optional device is not mounted, and uses the detection result of the second detector when the optional device is mounted. Therefore, the load capacity of the medium can be managed depending on whether or not the optional device is mounted.

(C) In the printing device, the discharge tray may have a moving portion configured to move to a lower position and an upper position above the lower position, and when the recording is performed under a specific condition, the controller may cause the moving portion to position at the upper position.

According to such a configuration, the controller positions the moving portion at the upper position when recording under specific conditions. Therefore, the medium recorded under the specific conditions can be satisfactorily loaded on the discharge tray.

(D) In the printing device, when the second detector detects the medium in the non-mounted case, the controller may execute the full load processing.

When the moving portion moves from the lower position to the upper position, the medium loaded on the moving portion also rises. When the first detector detects the raised medium, the controller executes the full load processing. According to such a configuration, the controller executes the full load processing when the second detector detects the medium in the non-mounted case of the optional device when recording under the specific conditions. Therefore, the full load processing can be executed before the moving portion is moved to the upper position.

(E) In the printing device, in a mounted case in which the optional device is mounted, when the second detector detects the medium in a case in which the moving portion is moved from the lower position to the upper position, the controller may execute the full load processing.

When the moving portion is moved to the upper position, the loaded medium is pushed up and a gap between the medium and the optional device becomes smaller. When the medium is passed through a small gap, there may be a possibility that the medium is caught. In that respect, according to such a configuration, when the second detector detects the medium in the case in which the moving portion is moved to the upper position, the controller executes the full load processing. Therefore, the possibility that the medium is caught can be reduced.

(F) In the printing device, a distance from the lower position to the upper position may be shorter than a distance from the first detector to the second detector.

When the moving portion is moved from the lower position to the upper position in the state in which the medium is loaded, the loaded medium is pushed up. For example, when the moving distance from the lower position to the upper position is longer than the distance from the first detector to the second detector, the first detector may detect the medium when the moving portion is moved to the upper position, even if the second detector does not detect the medium when the moving portion is positioned at the lower position. In that respect, according to such a configuration, the distance from the lower position to the upper position is shorter than the distance from the first detector to the second detector. Therefore, it is possible to reduce the possibility that the first detector detects the medium after moving the moving portion to the upper position.

(G) In the printing device, the discharge tray may have a loading surface on which the medium is loaded, and a shortest distance perpendicular to the loading surface between the optional device mounted on the mounting portion and the loading surface may be longer than a distance perpendicular to the loading surface between the second detector and the loading surface.

According to such a configuration, the shortest distance between the optional device mounted on the mounting portion and the loading surface is longer than the distance between the second detector and the loading surface. The shortest distance between the optional device and the loading surface is the maximum load capacity that can be loaded on the discharge tray when the optional device is mounted. The distance between the second detector and the loading surface is a second loading capacity detected by the second detector. That is, since the maximum load capacity is larger than the second load capacity, a possibility of overloading can be reduced.

(H) In the printing device, the full load processing may prohibit the recording by the recording portion.

According to such a configuration, the full load processing prohibits the recording. When the controller prohibits the recording, the loading of the medium on the discharge tray is also stopped. Therefore, the possibility of overloading can be reduced.

What is claimed is:

1. A printing device comprising:

a recording portion performing recording on a medium;

a discharge tray loading the medium recorded by the recording portion;

a first detector configured to detect the medium of a first load capacity loaded on the discharge tray;

a second detector configured to detect the medium of a second load capacity smaller than the first load capacity loaded on the discharge tray;

a mounting portion on which an optional device is mounted; and a controller controlling the recording by the recording portion, wherein the optional device mounted on the mounting portion is positioned above the discharge tray, the first detector and the second detector are positioned below the optional device mounted on the mounting portion, when the first detector detects the medium of the first load capacity in a non-mounted case in which the optional device is not mounted, the controller executes full load processing, the discharge tray has a moving portion configured to move to a lower position and an upper position above the lower position, when the recording is performed under a specific condition, the controller causes the moving portion to position at the upper position, and a distance from the lower position to the upper position is shorter than a distance from the first detector to the second detector.

2. The printing device of claim 1, wherein when the second detector detects the medium of the second load capacity in a mounted case in which the optional device is mounted, the controller executes the full load processing.

3. The printing device of claim 1, wherein in a case in which the recording is performed under the specific condition in the non-mounted case, when the second detector detects the medium, the controller executes the full load processing.

4. The printing device of claim 1, wherein in a mounted case in which the optional device is mounted, when the second detector detects the medium in a case in which the moving portion is moved from the lower position to the upper position, the controller executes the full load processing.

5. The printing device of claim 1, wherein the discharge tray has a loading surface on which the medium is loaded, and a shortest distance perpendicular to the loading surface between the optional device mounted on the mounting portion and the loading surface is longer than a distance perpendicular to the loading surface between the second detector and the loading surface.

6. The printing device of claim 1, wherein the full load processing prohibits the recording by the recording portion.

* * * * *